Oct. 14, 1952 — L. E. HERBORN — 2,614,152
DIELECTRIC TEST CIRCUIT
Filed April 29, 1949
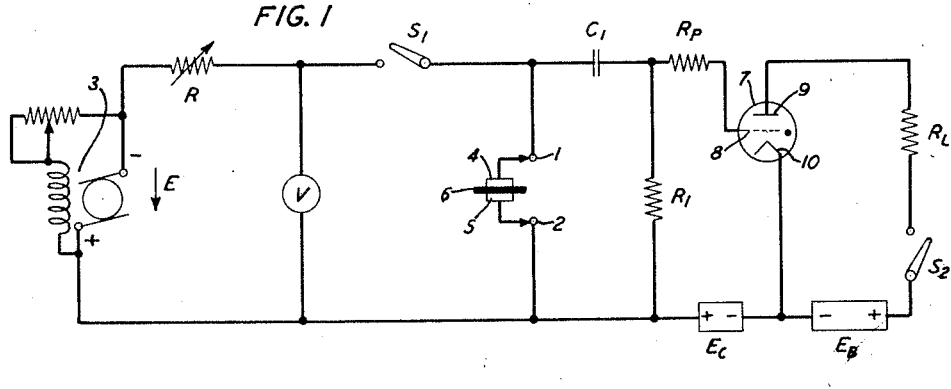
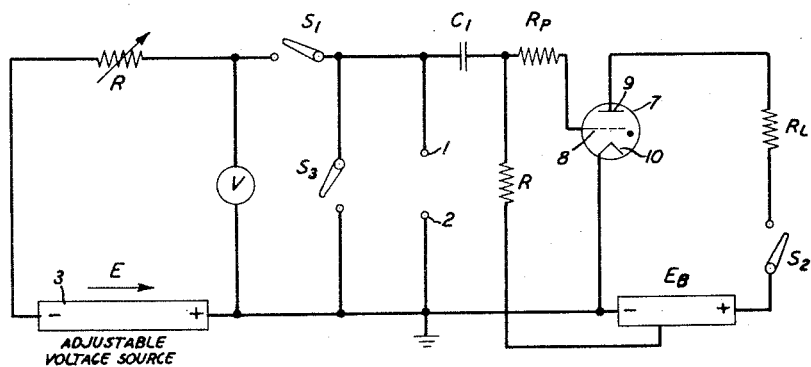
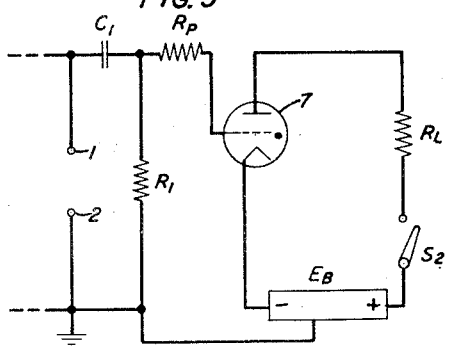 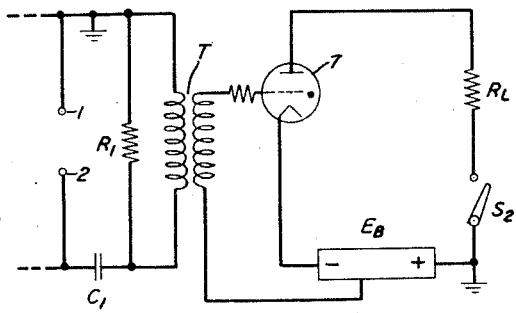
INVENTOR
L. E. HERBORN
BY
Walter M. Hill
ATTORNEY Patented Oct. 14, 1952

2,614,152

UNITED STATES PATENT OFFICE 2,614,152

DIELECTRIC TEST CIRCUIT

Ludwig E. Herborn, New York, N. Y., assignor to Bell Telephone Laboratories, Incorporated, New York, N. Y., a corporation of New York Application April 29, 1949, Serial No. 90,467

6 Claims. (Cl. 175—183)

1

This invention relates to apparatus for testing dielectric material and more particularly to apparatus for detecting momentary breakdown failures of very short duration.

In making dielectric tests for breakdown failures it often happens that a defective dielectric area permits a momentary arc which immediately clears but the latent defect nevertheless remains as a source of future trouble. The conductive material burns away so rapidly that most of the prior art test devices have been found incapable of detecting the short time short circuit which the defect causes. This is especially true with silver-coated mica condensers and other condensers where the conductive coating or foil burns or melts away from the defective dielectric area so quickly that the condenser appears good on the breakdown test. Actually, the latent defect remains and very frequently breaks down again in service.

It is the object of this invention to provide a very simple apparatus capable of extremely rapid operation so as to detect these momentary dielectric failures of very short duration.

The foregoing object is achieved by this invention which provides a charging circuit comprising a source of direct voltage and an impedance connected in series with a pair of test terminals to which the dielectric to be tested may be connected. A capacitor and a resistor are connected in series and across the test terminals. A high speed polarized relay means is coupled across the resistor so that the relay is unresponsive to currents charging said capacitor but quickly responsive to any discharge of said capacitor through the resistor upon a momentary short circuit across the test terminals.

The invention may be better understood by referring to the accompanying drawings in which:

Fig. 1 discloses one embodiment of the invention;

Fig. 2 discloses a modification of Fig. 1 and the preferred embodiment of the invention; and Figs. 3 and 4 disclose alternative arrangements of the polarized relay means which may be used in connection with either Fig. 1 or Fig. 2.

Referring to Fig. 1 it will be noted that the test set comprises a source of direct current 3 in series with a current-limiting resistor R, all shunted by a high resistance voltmeter V. A time constant circuit comprising condenser $C_1$ and a resistor $R_1$ are connected in series and across a pair of test terminals 1 and 2 to which may be connected a dielectric material 6 to be tested. In Fig. 1 it will be noted that dielectric material 6 is located between a pair of electrodes 4 and 5 and in so far as this invention is concerned this material may be of any kind and the electrodes 4 and 5 of any form suitable for engaging the dielectric material to be tested. It is also clearly evident that this assembly may actually constitute a capacitor to be tested and the apparatus has been found very useful for this purpose.

A gas-filled electron discharge device 7 having a control electrode 8, an anode 9 and a cathode 10 is connected with its input circuit through the current-limiting resistor $R_P$ across the resistor $R_1$. This tube is preferably of the cold-cathode type such as the Western Electric 727 type but it may be any of the other cold or hot cathode tubes that contain at least three electrodes one of which maintains a controlling influence over conduction so long as the tube remains non-conductive. In the Western Electric 727 tube either of the electrodes 10 or 8 may be connected to act as cathode or control electrode, the controlling action being in the form of a short auxiliary discharge gap between electrodes 8 and 10 which are adapted to start the discharge in the main gap between the anode 9 and electrode 8 or 10, whichever is connected to act as the cathode. A switch $S_1$ is provided for connecting the source of voltage E through series resistor R to the test terminals 1 and 2, thereby impressing the charging voltage on the test specimen. Series resistor R is preferably made adjustable so that with adjustable voltage source 3, both the charging rate and final test voltage for specimen 6 can be varied at will.

A source of direct current $E_B$ supplies the necessary voltage to operate the cold cathode tube 7. The positive pole of this source is connected to the anode 9 of the tube through a switch $S_2$ and a current-limiting resistor $R_L$. The glow of tube 7 during conduction is used to visually indicate a faulty dielectric specimen or capacitor under test. Resistor $R_L$ may also be some suitable form of a signaling device as, for example, a relay operating a bell, buzzer or lamp. The negative terminal of source $E_B$ is connected to the cathode 10 and to the negative terminal of a bias source $E_c$. Source $E_c$ provides a positive bias voltage to the control electrode 8 through the time constant resistor $R_1$ and the current-limiting resistor $R_P$.

The operation of the circuit shown in Fig. 1 is as follows: With switch $S_1$ open and switch $S_2$ closed, the dielectric specimen to be tested is connected across the terminals 1 and 2. The resistor R is set to a predetermined resistance value depending on the voltage and the charging rate requirements of the test. This voltage is read by voltmeter V and is adjusted by adjusting the field rheostat of source 3 in a conventional manner. Instead of the shunt generator schematically shown in Fig. 1, it is clearly evident that any type of conventional direct voltage source capable of being adjusted to meet different test requirements may be substituted for it.

With the apparatus thus set up as indicated above, switch $S_1$ is closed. A transient current flows which causes both the test specimen between the terminals 1 and 2 and the condenser $C_1$ of the time constant circuit to be charged. The time constant of circuit $C_1$, $R_1$ is not particularly critical but it must be sufficiently fast to accumulate an appreciable voltage charge in capacitor $C_1$ before dielectric 6 can break down. Should a breakdown occur in the dielectric specimen, the current from capacitor $C_1$ through resistor $R_1$ will be large enough to cause tube 7 to discharge and produce a visible glow indicative of the failure of the specimen. It will be noted that the direction of the charging current in the time constant circuit $C_1$, $R_1$ causes the voltage drop in resistor $R_1$ to decrease the voltage bias on the control electrode 8. The original bias of source $E_c$ was set just below the critical discharge voltage. Consequently, the charging current will not initiate a discharge in the cold cathode tube during the charging period. If, however, at any instant during or after the charging period, the dielectric 6 ruptures, thereby causing a temporary low resistance path between the terminals 1 and 2, the time constant capacitor $C_1$ instantaneously starts discharging and the direction of the current through resistor $R_1$ is opposite from that of the original charging current. This causes a voltage drop in the resistor $R_1$ which increases the voltage between the control electrode 8 and the cathode 10 to a value above the predetermined critical discharge voltage of the tube. A discharge will take place between electrodes 8 and 10, thereby initiating a discharge in the main gap between anode 9 and cathode 10. Current will then flow from the direct current source $E_B$, through the switch $S_2$, the resistor $R_L$, through the main gap 9, 10 of tube 7 and back to the direct current source. As is well known, this current continues to flow until the switch $S_2$ is opened.

It is important to note that the voltage across the specimen 6 will always reach an appreciable value before a breakdown can occur. The time constant of $C_1$, $R_1$ is made sufficiently short that capacitor $C_1$ will also always be charged to at least several volts before the specimen does break down. With voltage $E_c$ adjusted just below the critical discharge value for control gap 8—10 of tube 7, it is evident that the voltage required on capacitor $C_1$ need be only a few volts in order to initiate the discharge of tube 7 when the specimen 6 breaks down. Sufficient voltage on capacitor $C_1$ to successfully initiate the discharge of tube 7 is thus assured.

Fig. 2 is the preferred form of this invention. In this figure the source $E_c$ of Fig. 1 is eliminated and the biasing voltage for the control electrode 8 is tapped off the source $E_B$. With this arrangement the positive terminal of the voltage source 3 and the cathode of the tube 7 are at ground potential. Also there is connected in parallel with terminals 1, 2 a switch $S_3$ for checking the operation of this test set. This switch is of the snap type which only momentarily closes the circuit, so that it is always in the open position except for the very brief shorting interval when operated. In order to check the operation of the apparatus, it is not necessary to connect a specimen across terminals 1 and 2. The test procedure is similar to the one outlined for Fig. 1 except that after closing switch $S_1$, snap switch $S_3$ is operated. This simulates a short duration, low resistance path across terminals 1, 2 and causes the time constant condenser $C_1$ to momentarily discharge, ultimately causing current to flow through the signaling resistor $R_L$, indicating that the set is working satisfactory. It may here be noted that if resistor $R_L$ is a simple resistor without any signaling function, the glow of tube 7 may be used to indicate the fact that it is conducting current due either to the operation of switch $S_3$ or to the breakdown of a specimen connected to terminals 1 and 2.

The circuit of Fig. 3 is similar to that of Fig. 2 except that instead of connecting the ground side (+) of the voltage source 3 to the cathode 10, as in Fig. 2, it is connected to the junction point of the resistor $R_1$ and the biasing voltage terminal of the source $E_B$. The circuit of Fig. 3 is shown only in fragmentary form but its relation to Fig. 2 is perfectly obvious by simply comparing the circuits. The arrangement of Fig. 3 isolates source $E_B$ from any direct current path which might include the high voltage source E due to a leaky time constant condenser $C_1$. Thus if source $E_B$ is a battery this circuit will prevent it from being discharged during the time that switch $S_1$ is closed. This feature is particularly advantageous when making life tests on dielectric specimens.

The embodiment disclosed in Fig. 4 is similar to that of Fig. 3 except that the polarized relay means 7 is coupled across resistor $R_1$ through a transformer instead of by direct coupling as before. It will be noted that this insulates the tube circuit from the high voltage source E and permits greater flexibility and greater safety. Voltage source 3 may have a negative ground as symbolically shown in Fig. 4 so that the switches may be arranged with their knife sides or exposed electrical parts all at ground potential. It will be noted in Fig. 4 that switch $S_2$ also has its knife blade connected to ground. When Fig. 4 is compared with Fig. 2 it will be seen that test terminal 1 is grounded rather than test terminal 2, thereby placing ground on the knife blades of switches $S_1$ and $S_2$.

From the foregoing description and the illustrations in the drawings, it should be evident that the specific examples given and arrangements shown are illustrative of the application of the principles of this invention and that numerous other arrangements may be devised by those skilled in the art without departing from the spirit and scope of the invention. This is particularly true in connection with the polarized relay means comprising gas-filled tube 7. This tube and its associated circuits are used in the embodiments of this invention as a polarized relay means capable of operating in response to only one direction of current flow through resistor $R_1$. It is clearly evident that other types of polarized relay means, well known in the art, may be substituted for this particular one. The gas-filled tube is selected for illustrating the invention and is preferred because of its simplicity and speed of operation.

What is claimed is:

1. A dielectric tester for detecting momentary breakdown of a dielectric comprising a source of direct voltage and an impedance connected in series and directly across a pair of test terminals to which the dielectric to be tested may be connected, a capacitor and a resistor connected in series and across said test terminals, a polarized relay means coupled across said resistor and so constructed and arranged as to operate only upon the discharge of said capacitor through the resistor due to a momentary short across the test terminals.

2. A dielectric tester for detecting momentary breakdown of a dielectric comprising a source of direct voltage and an impedance connected in series and directly across a pair of test terminals to which the dielectric to be tested may be connected, a capacitor and a resistor connected in series and across said test terminals, a gas-filled electron discharge tube having at least an anode, a cathode and a control electrode, and circuits coupling the control electrode and cathode to said resistor whereby the tube may be caused to discharge in response to a voltage drop in said resistor only upon the discharge of said capacitor through the resistor due to a momentary short across the test terminals.

3. A dielectric tester for detecting momentary breakdown of a dielectric comprising a source of direct voltage and an impedance connected in series and directly across a pair of test terminals to which the dielectric to be tested may be connected, a capacitor and a resistor connected in series and across said test terminals, a gas-filled electron discharge tube having an anode, a cathode and control electrode, and circuits connecting the control electrode and cathode across said resistor whereby the tube may be caused to discharge only upon the discharge of said capacitor through the resistor due to a momentary short across the test terminals.

4. The combination of claim 1 wherein said voltage source and said impedance are variable to provide variable charging conditions for the dielectric which may be connected to said test terminals.

5. The combination of claim 2 wherein said voltage source and said impedance are variable to provide variable charging conditions for the dielectric which may be connected to said test terminals.

6. The combination of claim 3 wherein said voltage source and said impedance are variable to provide variable charging conditions for the dielectric which may be connected to said test terminals.

LUDWIG E. HERBORN.

REFERENCES CITED

The following references are of record in the file of this patent:

UNITED STATES PATENTS

| Number | Name | Date |
|---|---|---|
| 2,087,783 | Savage | July 20, 1937 |
| 2,220,489 | Lowkrantz | Nov. 5, 1940 |
| 2,245,603 | Paul | June 17, 1941 |
| 2,522,151 | Weeks | Sept. 12, 1950 |